United States Patent [19]

Cohen et al.

[11] 4,116,553
[45] Sep. 26, 1978

[54] DISPLAY METHOD AND APPARATUS

[76] Inventors: Norman E. Cohen; Hannah M. Cohen, both of 4709 Highview Blvd., Erie, Pa. 16509

[21] Appl. No.: 761,297

[22] Filed: Jan. 21, 1977

[51] Int. Cl.$^2$ ............................................. G03B 21/00
[52] U.S. Cl. ....................................... 353/31; 353/94; 353/121
[58] Field of Search ..................... 353/30, 31, 34, 94, 353/97, 121, 122; 35/53, 28.3; 240/46.39

[56] References Cited

U.S. PATENT DOCUMENTS

| 2,301,274 | 11/1942 | Greiser | 353/30 |
| 2,591,428 | 4/1952 | Harris et al. | 353/31 |
| 2,600,261 | 6/1952 | Pennington | 353/30 |
| 3,352,200 | 11/1967 | Berger | 353/37 |
| 3,981,573 | 9/1976 | Schwartz | 353/37 |

FOREIGN PATENT DOCUMENTS 370,503  3/1923  Fed. Rep. of Germany ............ 35/28.3

*Primary Examiner*—Harry N. Haroian
*Attorney, Agent, or Firm*—Charles L. Lovercheck

[57] ABSTRACT

A display apparatus and method for comparing color combinations for carpet, drapery and wall decorating, consisting of a screen, light passages and projectors for directing images through the passages onto the screen. Observers compare the color scheme represented by the combined images. The images can be selected by an operator, who can change the images automatically by remote control and a catalog of images at hand. The operator can be a decorator salesman and the viewer may be a customer.

5 Claims, 4 Drawing Figures

DISPLAY METHOD AND APPARATUS

REFERENCE TO PRIOR ART

Various methods of projecting multiple images in a combined manner are well known in the art, for example, U.S. Pat. Nos. 3,975,094; 3,336,681; and 3,822,939. None of these patents show methods and apparatus disclosed herein.

OBJECTS OF THE INVENTION

It is an object of the invention to provide an improved method and apparatus for displaying color samples.

Another object of the invention is to provide a method and apparatus for displaying color samples that is simple, economical and efficient.

With the above and other objects in view, the present invention consists of the combination and arrangement of parts hereinafter more fully described, illustrated in the accompanying drawing and more particularly pointed out in the appended claims, it being understood that changes may be made in the form, size proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
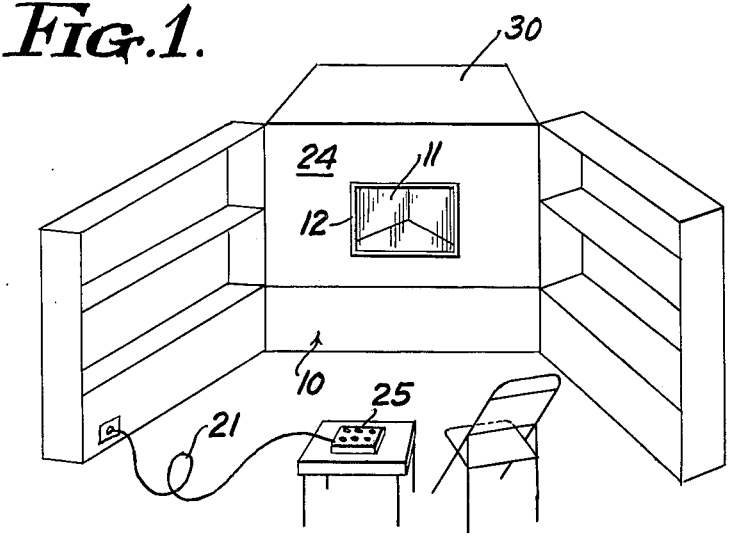
FIG. 1 is a front view of the apparatus for displaying color combinations according to the invention.
Figure 2:
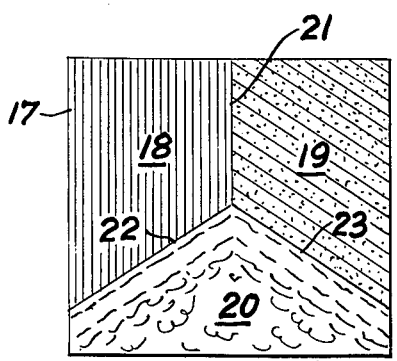
FIG. 2 is an end view of the tunnel according to the invention.

Now, with more particular reference to the drawings, the display apparatus indicated generally at 10, includes a screen 11 located in a window 12 in the display wall 24 and a projector support 13 having three projectors 14, 15 and 16 supported on it and a light tunnel 17 having light paths 18, 19 and 20 for directing light from the respective projectors on to the back of the screen 11 at the window 12. The projectors 14, 15 and 16 are connected to a remote control 25 accessible to an operator on the side of the screen opposite the projectors and connected to the projectors by electrical cords indicated at 21.

The light tunnel 17 has the three partitions 21, 22, and 23 which divide the light tunnel 17 into the three light paths 18, 19 and 20. The light tunnel 17 terminates in close-space relation to the back of the screen 11, and the outside of the light tunnel 17 is approximately the same size as the window 12.

Figure 3:
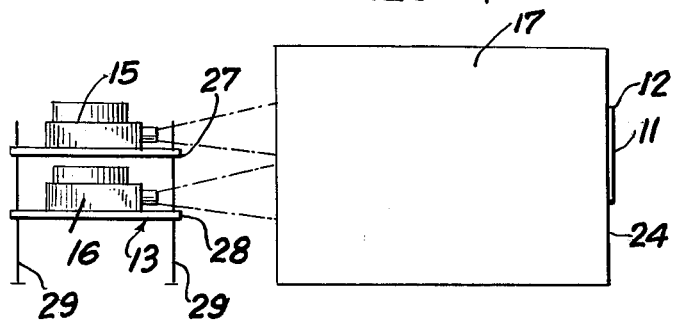
FIG. 3 is a side view of the tunnels and projectorsaccording to the invention.
Figure 4:
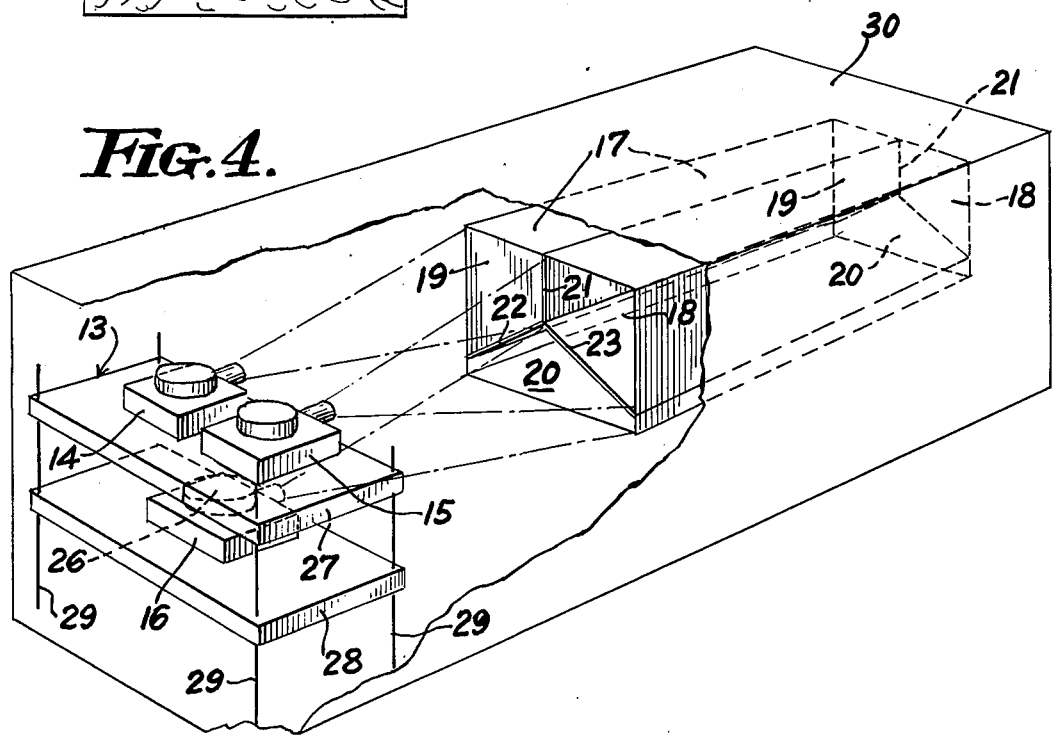
FIG. 4 is an isometric view of the projector support and tunnel according to the invention.

The projectors 14, 15 and 16 are arranged in the manner shown in FIGS. 3 and 4 and they may be of the cassette type indicated with a magazine 26 for receiving the color samples or color slides.

The projector support 13 is made up of an upper shelf 27 and a lower shelf 28 supported on rods 29 which may be connected to the ceiling or to any other suitable location. Two projectors 14 and 15 are supported on the shelf 27 and the single projector 16 is supported on the lower shelf 28.

The projectors, lights and support 13 are all separately enclosed in a light-proof booth, closed at its front by the screen 11 and the viewers may stand on the side of the screen remote from the projectors 14, 15 and 16 and view the colors projected through the window 12.

The viewer and operator will stand on the side of the screen remote from the projectors. The operator will have an index to the slides or samples in the cassettes 26 and have a remote control for the projectors at hand. The operator will then select colors from his color chart, identify them by number, and project slides corresponding to these numbers onto the screen, meanwhile discussing the merits of the combinations to the customer. The effects of the light tunnels projecting these colors on the divided screen is to give a three-dimensional effect on a flat screen so that the customers can study the various color combinations easily and make their selection from them.

The foregoing specification sets forth the invention in its preferred, practical forms, but the structure shown is capable of modification within a range of equivalents without departing from the invention which is to be understood is broadly novel as is commensurate with the appended claims.

The embodiment of the invention in which an exclusive property or privilege is claimed are defined as follows:

1. A display apparatus comprising,
    a screen,
    a light tunnel,
    projector means,
    said screen comprising a back lighted type screen adapted to fit the end of the said light tunnel in close-spaced relation,
    said light tunnel comprising an enclosure open at the end adjacent to said projector means and open at the end adjacent to said screen,
    said light tunnel comprising an enclosure divided into at least three distinct and separate light paths by partition means extending the full length of said tunnel,
    said partition means comprises a first partition extending vertically of said tunnel and second and third partitions connected to and extending downwardly from the end of said first partitions such that the three partitions form angles of 120 degrees with each other whereby said colors projected on said screen combine to form a three dimensional representation of a corner of a room with an area for floor, wall and drapery surfaces to enable the comparison of different combinations of colors and patterns.
    said projector means being adapted to selectively direct at least three color images through said light paths,
    said partitioned light paths divide the screen so that the images projected on the said screen look like the corner of a room with an area for floor, wall, drapery surfaces to enable the comparison of different colors and patterns.

2. A display apparatus comprising,
    a screen,
    a light tunnel,
    projector means,
    said screen comprising a back lighted type screen adapted to fit the end of the said light tunnel in close-spaced relation, said light tunnel comprising an enclosure open at the end adjacent to said projector means and open at the end adjacent to said screen, said light tunnel comprising an enclosure divided into at least three distinct and separate light paths by partition means extending the full length of said tunnel, said partition means comprises a first partition extending vertically of said tunnel and second and third partitions connected to and extending downwardly from the end of said first partitions such that the three partitions form angles of 120 degrees with each other whereby said colors projected on said screen combine to form a three dimensional representation of a corner of a room with an area for floor, wall and drapery surfaces to enable the comparison of different combinations of colors and patterns.

said projector means being adapted to selectively direct at least three color images through the said light paths, said projector means comprises, at least three projectors, said screen fitted into one end of the said light tunnel, said projectors are supported at the said open end of said light tunnel opposite the said screen, said projectors are adapted to selectively direct color images through the said partitioned light paths, said light paths are divided by the said partitions so that the images projected on the screen combine to be a three dimensional representation of the corner of a room with an area for floor, wall and drapery surfaces to enable the comparison of different combination of colors and patterns.

3. A display apparatus comprising a screen, a light tunnel, projector means, said screen comprising a back lighted type screen adapted to fit the end of the said light tunnel in close-spaced relation, said light tunnel comprising, an enclosure open at the end adjacent to said projector means and open at the end adjacent to said screen, said light tunnel comprising an enclosure divided into at least three distinct and separate light paths by partition means extending the full length of said tunnel, said partition means comprises a first partition extending vertically of said tunnel and second and third partitions connected to and extending downwardly from the end of said first partitions such that the three partitions form angles of 120 degrees with each other whereby said colors projected on said screen combine to form a three dimensional representation of a corner of a room with an area for floor, wall and drapery surfaces to enable the comparison of different combinations of colors and patterns.

said projctor means being adapted to selectively direct at least three color images through the said light paths, said projector means comprises, at least three projectors, said screen fitted into one end of the said light tunnel, said projectors are supported at the said open end of said light tunnel opposite the said screen, said projectors are supported at the said open end of said light tunnel opposite the said screen, said projectors are adapted to selectively direct color images through the said partitioned light paths, said partitions comprise a first partition being generally vertical and a second and a third partition which extend downwardly at an acute angle to the horizontal whereby said color slides projected on said screen resemble a wall, floor and drapery portion of a room.

4. A method of comparing combinations of color and patterned materials comprising, providing a plurality of remotely controlled automatically loaded optical projectors, providing a plurality of light paths, isolating said light paths from each other by a partition means extending the full length of said tunnel, said partition means comprises a first partition extending vertically of said tunnel and second and third partitions connected to and extending downwardly from the end of said first partitions such that the three partitions form angles of 120 degrees with each other whereby said colors projected on said screen combine to form a three dimensional representation of a corner of a room with an area for floor, wall and drapery surfaces to enable the comparison of different combinations of colors and patterns.

each focusing on a separate area of a screen, the areas each being separated by said partitions into a light tunnel, providing a plurality of color and pattern sources simulating the colors and patterns available to select from, loading said colors and pattern sources in said optical projectors, projecting said color and pattern sources onto said screen in a pattern simulating a three-dimensional area and automatically selecting and changing said color and pattern sources by a remote control accessible to a person viewing said screen to compare different combinations of said colors and patterns.

5. The method recited in claim 4 wherein said sources are slides and said optical projectors are slide projections.

* * * * *